United States Patent [19]

Inoue et al.

[11] Patent Number: 5,120,804
[45] Date of Patent: Jun. 9, 1992

[54] EASILY CRYSTALLIZABLE POLYPHENYLENE SULFIDE COPOLYMER AND PREPARATION THEREOF

[75] Inventors: Hiroshi Inoue; Toshikazu Kato; Masaaki Ohtsuru, all of Mie, Japan

[73] Assignees: Tosoh Corporation, Yamaguchi; Toso Susteel Co., Ltd., Tokyo, both of Japan

[21] Appl. No.: 596,661

[22] Filed: Oct. 11, 1990

[30] Foreign Application Priority Data

Oct. 12, 1989 [JP] Japan .................................. 1-264056
Jan. 22, 1990 [JP] Japan .................................. 2-10745
Sep. 21, 1990 [JP] Japan .................................. 2-250138

[51] Int. Cl.⁵ ...................... C08G 75/14; C08G 75/16
[52] U.S. Cl. ................................ 525/537; 525/333.9; 525/535; 528/388
[58] Field of Search .................. 525/333.9, 537, 535; 526/62; 528/388

[56] References Cited

U.S. PATENT DOCUMENTS 4,355,059 10/1982 Blackwell ........................... 427/388.2
4,451,607 5/1984 Garcia ................................. 524/494
4,888,390 12/1989 Liang ................................... 525/189

FOREIGN PATENT DOCUMENTS 45-3368   1/1970 Japan .
1056227   2/1967 United Kingdom .

Primary Examiner—Joseph L. Schofer
Assistant Examiner—Fred Zitomer
Attorney, Agent, or Firm—Sughrue, Mion, Zinn, Macpeak & Seas

[57] ABSTRACT

There are disclosed a class of halogen-ended polyalkylene glycols and halogen-ended polyolefins (II) which are copolymerizable with polyarylene sulfides or sulfone-based polymers. These halogen-ended polymers may be readily copolymerized with polyarylene sulfides or sulfone-based polymers to provide polyphenylene sulfide copolymers (I) exhibiting increased crystallization speeds. These high crystallization speeds enable the copolymers to be molded in a low-temperature mold, for example, at 100° C. or less, while providing fully crystallized moldings having excellent heat resistance properties.

4 Claims, 4 Drawing Sheets

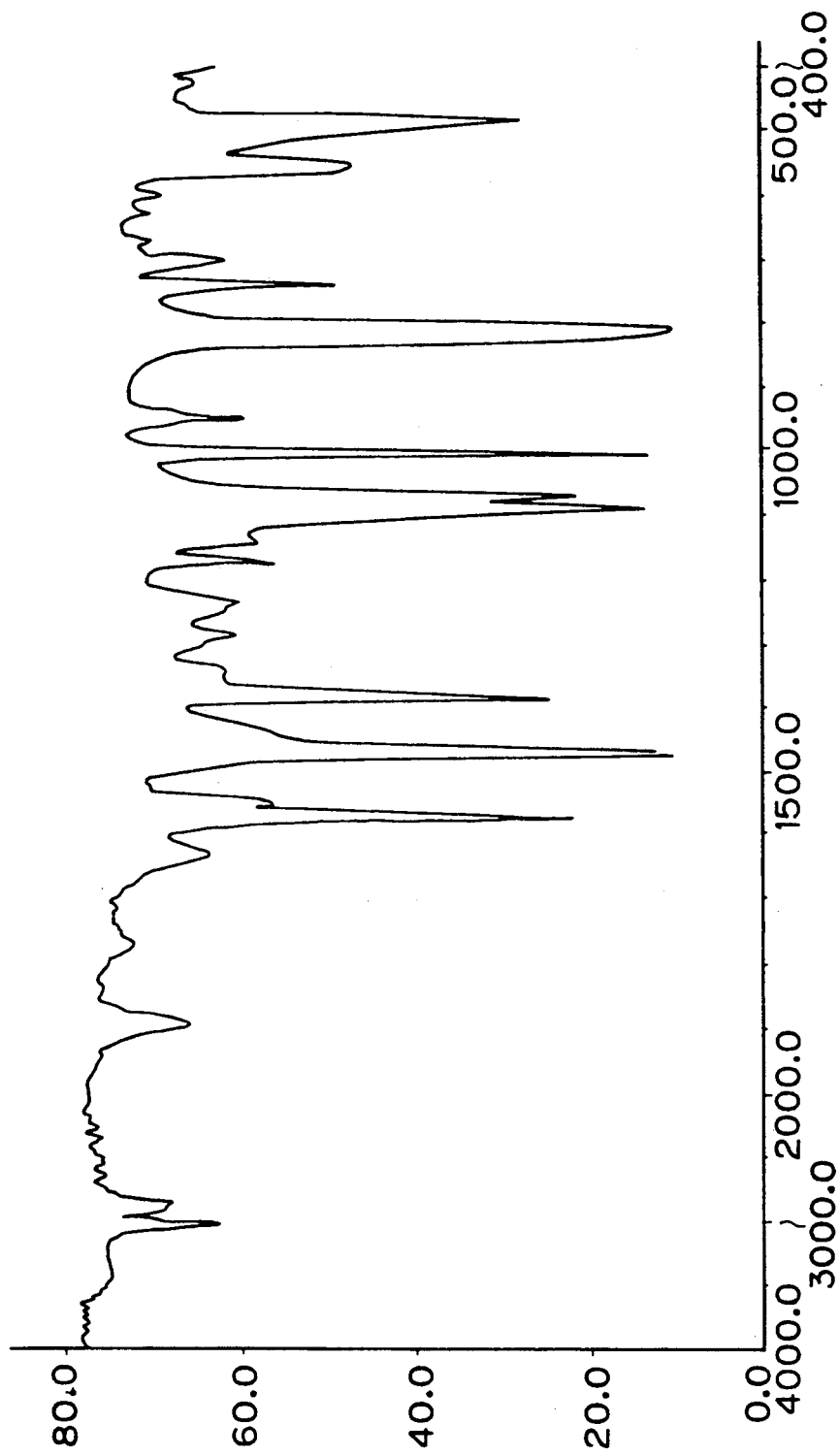

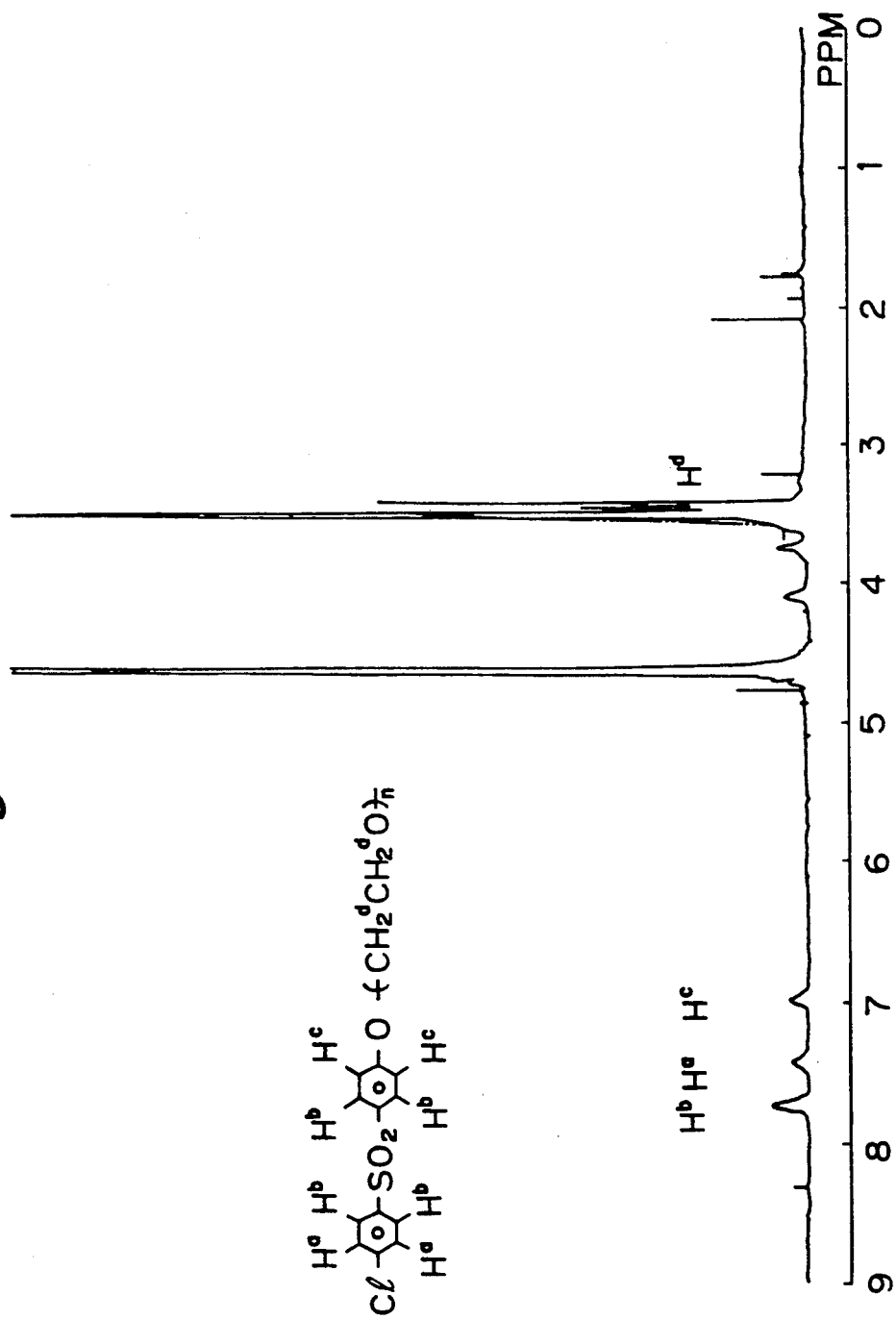

EASILY CRYSTALLIZABLE POLYPHENYLENE SULFIDE COPOLYMER AND PREPARATION THEREOF

FIELD OF THE INVENTION

This invention relates to a class of easily crystallizable polyphenylene sulfide copolymers, a class of halogen-ended polymers, and preparation of the copolymers and polymers. In particular, the invention relates to copolymers of polyphenylene sulfide with polyolefins or polyalkylene glycols, to halogen-ended polyolefins or polyalkylene glycols and to preparation of the copolymers or the polyolefins or polyalkylene glycols.

Polyphenylene sulfide materials have excellent heat and chemical resistance properties and, hence, have attracted a good deal of attention as materials useful for producing parts in electrical and electronic instruments, automotive parts and the like. Polyphenylene sulfides may be formed or molded, for example, by injection or extrusion molding technique into various molded parts, films, sheets, fibers and the like. These molded products have been used in applications where high heat and chemical resistance properties are required.

PRIOR ART

A typical method of production of the polymers is known, for example, in Japanese Patent Publication (KOKOKU) No. 45-3368, which method comprises heating and reacting a dihalo-aromatic compound with an alkali metal sulfide, such as sodium sulfide, in a polar aprotic solvent, such as N-methyl pyrrolidone. However, the polyphenylene sulfide polymers, which will be abbreviated as "PPS" hereinafter, have a relatively high glass transition temperature on the order of 90° C. and will slowly crystallize. Therefore, where the PPS materials are molded into articles by injection molding, the mold temperature should be set in the range of about 130°-150° C. to ensure production of the articles of acceptable quality. This is true even if poly(p-phenylene sulfide) that is the most crystallizable PPS material is employed. Such a crystallizing behavior is a serious drawback of the PPS materials when used in molding applications in comparison with other engineering plastics, for example, nylons and PBT, that, in general, can be satisfactorily molded with a mold temperature of less than 100° C. This is considered to be a factor inhibiting expansion of applications of the PPS materials. Nevertheless, no techniques have been proposed to obtain PPS materials which are crystallizable at such an increased speed that employment of a mold temperature lower than 100° C. is permitted to achieve satisfactory crystallization in the molded product.

It is known that a hydroxy-ended polyolefin or polyalkylene glycol may react with an isocyanate group or carboxyl group containing organic compound so as to form, for example, a polyurethane, polyester or polyether amide into which said polyolefin or polyalkylene glycol has been introduced as soft segment and which is a thermoplastic elastomer having excellent properties.

It is also known that polyethylene terephthalate may be copolymerized with a polyalkylene glycol so as to endow said polyethylene terephthalate with an increased speed of crystallization.

On the other hand, although polyarylene sulfides, a typical example of which is polyphenylene sulfide, and polysulfone polymers, typical examples of which are polyether sulfones and polysulfone per se, are excellent in the thermal resistance properties, these polymers which are prepared by nucleophilic substitution of aromatic dihalides are difficultly reacted with a hydroxy-containing polyolefin or polyalkylene glycol to give a copolymer. In this case, therefore, it has been necessary to modify the polyolefin or polyalkylene glycol so as to give an intended copolymer.

However, any modification technique, that is a technique for preparing a modified polyolefin or polyalkylene glycol copolymerizable with polyphenylene sulfide, polysulfones and the like has not been proposed.

SUMMARY OF THE INVENTION

Accordingly, the present invention provides an easily crystallizable polyphenylene sulfide copolymer which is prepared by introducing either polyolefin or polyalkylene glycol segments into a PPS material so as to endow said PPS with a significantly increased crystallization speed that permits said PPS to satisfactorily crystallize even at a relatively low mold temperature. Further, the invention provides a halogen-ended polymer which is capable of copolymerizing with polyarylene sulfides or sulfone-based polymers by virtue of the halogen introduced at the ends of said polymer. Further, the invention provides processes for producing such as easily crystallizable polyphenylene sulfide copolymer and such a halogen-ended polymer.

Accordingly, the invention provides an easily crystallizable polyphenylene sulfide copolymer of the structure represented by formula (I):

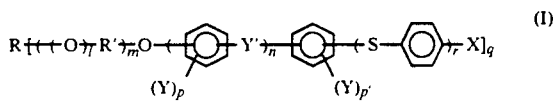

wherein R is hydrogen or an organic group containing 1-24 carbon atoms, each of groups R' is an alkylene group containing 2-6 carbon atoms, each of groups Y is an electron attractive monovalent group, each of groups Y' is an electron attractive divalent group, X is a halogen, l is an integer of zero or 1, m is an integer of from 10 to 10,000, n is an integer of from zero to 4, p is an integer of from zero to 4, p' is an integer of from zero to 4, q is an integer of from 1 to 10, and r is an integer of from 20 to 2,000.

According to the invention, there is also provided a halogen-ended polymer which is represented by formula (II):

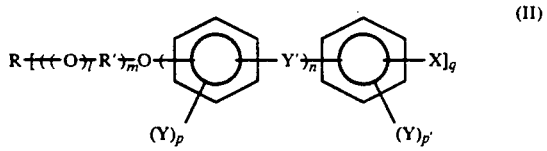

wherein R is hydrogen or an organic group containing 1-24 carbon atoms, each of groups R' is an alkylene group containing 2-6 carbon atoms, each of groups Y is an electron attractive monovalent group, each of groups Y' is an electron attractive divalent group, X is a halogen, l is an integer of zero or 1, m is an integer of from 10 to 10,000, n is an integer of from zero to 4, p is an integer of from zero to 4, p' is an integer of from zero to 4, and q is an integer of from 1 to 10.

The invention also provide a process for preparing the above-defined easily crystallizable polyphenylene sulfide copolymer (I).

Further, the invention provides a process for preparing the above-defined halogen-ended polymer (II).

BRIEF DESCRIPTION OF THE DRAWINGS

FIG. 3 shows an IR chart for the PPS copolymer prepared in Example 9. In addition to absorptions resulting from PPS, there is an absorption at 2850 cm$^{-1}$ due to the methylene residues of the polyethylene glycol.

FIG. 4 is an $^1$H-NMR chart of a polyethylene glycol that was modified at its ends according to the invention. From this chart, the ratio of the aromatic protons introduced at the ends to the methylene protons of the polyethylene glycol was obtained and the value of $\overline{Mn}$ (NMR) was calculated therefrom.

DETAILED DESCRIPTION OF THE PREFERRED EMBODIMENT

Figure 1:
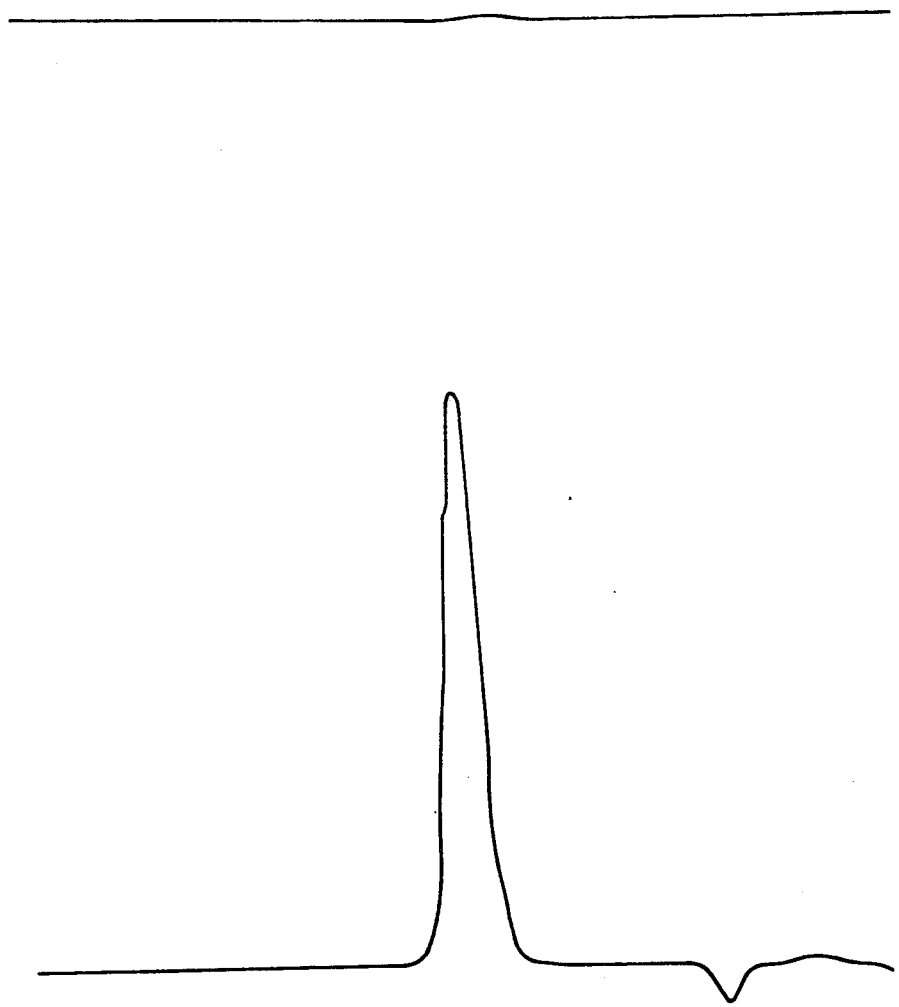
FIGS. 1 and 2 show the GPC elution curves for the unmodified and modified polyethylene glycols, respectively, used in the Examples. In each of FIGS. 1 and 2, the upper curve was determined by a UV detector and the bottom curve was determined by an RI detector.

Preferred embodiments according to the invention which may be mentioned include:

(i) a halogen-ended polyalkylene glycol of formula (II) where R is a $C_1-C_{12}$ organic group, R' is a $C_2-C_4$ alkylene group, Y is a cyano group, Y' is a sulfone or carbonyl group, X is fluorine, chlorine or bromine, m is 10–7,000, n is zero or 1, p and p' are each zero or 1, q is from 1 to 6, and l is 1 (unity):

(ii) a block copolymer of said polyalkylene glycol (i) with a PPS in which the value of r is 20–1,000, said copolymer (ii) being of formula (I);

(iii) a halogen-ended polyolefin which is defined similarly to said halogen-ended polyalkylene glycol (i) except that the value of l is zero, said polyolefin (iii) being of formula (II); and (iv) a block copolymer of said polyolefin (iii) with a PPS as used in said copolymer (ii), said block copolymer (iv) being of formula (I).

Though group R in formulae (I) and (II) is defined to be a $C_1-C_{24}$ organic group, it should be understood that group R may carry a hetero atom-containing functional group or groups, such as ether, ketone, amide, sulfone or the like.

The value of m in formulae (I) and (II) represents the degree of polymerization with respect of the polyolefin or polyalkylene glycol segment and is preferably in the range of from 10 to 7,000. With a polymerization degree outside the above-mentioned range, the characteristics of the soft segment derived from the polyolefin or polyalkylene glycol chain may not be developed to a desirable extent and at the same time the crystallization speed of the PPS substrate may not be increased to an appreciable level. Therefore, employment of a polymerization degree outside the above-mentioned range of m is not desirable for the purpose of the invention. Accordingly, the polyolefin or polyalkylene glycol segment in the copolymers according to the invention should preferably have a molecular weight in the range of from 500 to 500,000.

Groups Y and Y' in formulae (I) and (II) are an electron attractive, monovalent group and an electron attractive, divalent group, respectively. In other words, they are substituents having positive Hammett's σ substituent constants. Examples of Y which may be mentioned include —CN, —NO$_2$, —COOR, —SO$_3$R and —CONR$_2$ where R is hydrogen, a $C_1-C_{24}$ organic radical or an alkali metal. Examples of Y' which may be mentioned include —CO—, —N=N—, —CONH—, —SO$_2$—, etc.

The preparation of the easily crystallizable PPS copolymers and the halogen-ended polymers according to the invention will be described.

The easily crystallizable PPS copolymers of the invention may be produced by heating and reacting either a halogen-ended polyolefin or polyalkylene glycol of formula (II):

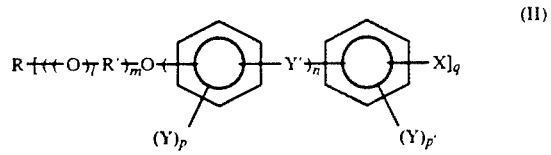

with a dihalobenzene and an alkali metal sulfide in a polar aprotic solvent, wherein R is hydrogen or an organic group containing 1–24 carbon atoms, each of groups R' is an alkylene group containing 2–6 carbon atoms, each of groups Y is an electron attractive monovalent group, each of groups Y' is an electron attractive divalent group, X is a halogen, l is an integer of zero or 1 (unity), m is an integer of from 1 to 10,000, n is an integer of from zero to 4, p is an integer of from zero to 4, p' is an integer of from zero to 4 and q is an integer of from 1 to 10.

The halogen-ended polymer of the above formula (II) may be produced by reacting either a hydroxy-ended polyolefin or polyalkylene glycol of formula (III):

with an aromatic dihalogen compound of formula (IV) activated by electron attractive groups attached thereto

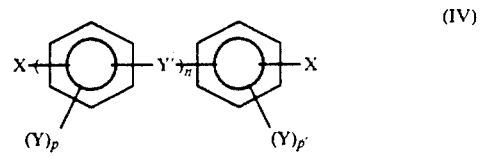

in the presence of a base in an aprotic solvent, wherein R is hydrogen or a $C_1-C_{24}$ organic group, R' is a $C_2-C_6$ alkylene group, l is zero or 1, m is an integer of 10–10,000, and q is an integer of 1–10, X is a halogen and, where p=0, is fluorine, Y and Y' are an electron attractive monovalent group and an electron attractive divalent group, respectively, n is an integer of from zero to 4, and p and p' each represent an integer of from zero to 4.

First, the conditions under which the easily crystallizable PPS copolymer is produced from the halogen-ended polymer (II), dihalobenzene and alkali metal sulfide will be described.

As the dihalobenzene which may be used in the invention, p-dihalobenzenes are preferred, for example, p-dichlorobenzene, p-dibromobenzene, p-di-iodobenzene and a mixture thereof, with p-dichlorobenzene the most preferred. In order to a PPS product exhibiting an increased degree of crystallization and an excellent thermal resistance, it is necessary to use a p-dihalobenzene as the dihalobenzene reactant. However, other dihalo-aromatic compounds, for example, m-dihalobenzenes (e.g. m-dichlorobenzene), o-dihalobenzenes (e.g. o-dichlorobenzene), dichloronaphthalene, dibromonaphthalene, dichlorodiphenyl sulfone, dichlorobenzophenone, dichlorodiphenyl ether, dichlorodiphenyl sulfide, dichlorodiphenyl, dibromodiphenyl, dichlorodiphenyl sulfoxide and the like may be copolymerized in a proportion of up to 30 mole % of the p-dihalobenzene, if desired. Further, a polyhalo-aromatic compound containing three or more halogen atoms in the molecule, for example, trichlorobenzene, tribromobenzene, tri-iodobenzene, tetrachlorobenzene, trichloronaphthalene, tetrachloronaphthalene or the like may be used in conjunction with the dihalobenzene reactant.

Examples of the alkali metal sulfides which may be used include sulfides of lithium, sodium, potassium, rubidium and cesium and mixtures thereof. The alkali metal sulfide may be employed in the hydrated form. The alkali metal sulfide may be prepared by reacting an alkali metal hydrosulfide with an alkali metal base or reacting hydrogen sulfide with an alkali metal base. The alkali metal sulfide may be formed in situ prior to the introduction of the dihalo-aromatic compound into the polymerization reaction system. Of course, the metal sulfide may be prepared outside the reaction system and then introduced thereinto. Of the above-listed alkali metal sulfides, sodium sulfide is preferably used in the invention.

Preferably the reactor system in which the dihalobenzene is polymerized should be dehydrated, for example, by distillation, to a water content of less than about 4 moles of $H_2O$ per mole of the alkali metal sulfide present prior to the polymerization. During the polymerization process, the water content in the reactor system may be varied, if desired.

As the polymerization solvent used in the invention, a polar solvent, in particular one that is aprotic and stable to alkali at elevated temperatures is preferred. Examples which may be mentioned include N,N-dimethylacetamide, N,N-dimethylformamide, hexamethylphosphoramide, N-methyl-ϵ-caprolactam, N-ethyl-2-pyrrolidone, N-methyl-2-pyrrolidone, 1,3-dimethylimidazolidine, dimethylsulfoxide, sulfolane, tetramethylurea and the like and mixtures thereof.

The halogen-ended polymer reactant of formula (II) may be introduced into the system at any process stage of dehydration and/or polymerization. Preferably, the halogen-ended polymer reactant (II) is added together with the dihalobenzene reactant to the system after the alkali metal sulfide has been dehydrated. It is also preferred to introduce the halogen-ended polymer reactant (II) into the system after the alkali metal sulfide and the dihalobenzene reactant are reacted together.

The halogen-ended polymer reactant which is introduced into the system may be in the form of a reaction mixture as such that has resulted from the reaction of between a hydroxy-ended polyalkylene glycol or hydroxy-ended polyolefin (III) and an aromatic dihalogen compound (IV) in an aprotic solvent (this reaction will be described in more detail hereinafter). Alternatively, the halogen-ended polymer (II) may be isolated from the reaction mixture and then added to the system for preparing the easily crystallizable PPS copolymer.

The polymerization is effected with stirring at a temperature of 200°–300° C., preferably 220°–280° C., for a period of 0.5–30 hours, preferably 1–15 hours.

The molar ratio of alkali metal sulfide to dihalobenzene used in the invention preferably ranges from 1.00:0.90 to 1.00:1.10.

The polar aprotic solvent may be used in such a proportion that the produced PPS copolymer will be present in a concentration of 3–60%, preferably 7–40%, by weight in the final reaction mixture.

Recovery of the thus produced PPS copolymer from the reacted mixture may be conventionally effected. For example, the solvent is removed from the reacted mixture by distillation, flashing of the like and then the product polymer is washed with water and recovered. Alternatively, the reacted mixture may be filtered to remove the solvent and then the polymer may be washed with water and recovered.

The thus prepared PPS copolymer exhibits an increased speed of crystallization as compared with the conventional PPS materials. Such an increased crystallization speed permits the present PPS copolymers to be satisfactorily injection molded using a mold held at a temperature as low as less than 100° C. to provide molded articles that are highly crystallized and excellent in the thermal resistance properties.

If desired, reinforcing fillers, for example, glass fibers, carbon fibers, ceramic fibers (e.g., alumina and the like fibers), aramide fibers, wholly aromatic polyester fibers, metallic fibers, potassium titanate whisker and the like may be incorporated to the present PPS copolymer materials. Further, inorganic fillers and organic and inorganic pigments may be incorporated. Examples of the inorganic fillers include calcium carbonate, mica, talc, silica, barium sulfate, calcium sulfate, kaolin, clay, pyroferrite, bentonite, sericite, zeolites, nepheline syenite, attapulgite, wollastonite, PMF, ferrites, calcium silicate, magnesium carbonate, dolomite, antimony trioxide, zinc oxide, titanium oxide, magnesium oxide, iron oxides, molybdenum disulfide, graphite, gypsum, glass beads, powdered glass, glass balloons, quartz, quartz glass, and mixtures thereof.

In addition, plasticizers, mold release agents, silane or titanate coupling agents, lubricants, heat stabilizers, weathering agents, nucleating agents, blowing agents, rust-proofing agents, ion-trapping agents, flame-retardants and flame-proofing aids may also be incorporated, if desired.

If desired, homopolymers such as polyethylene, polypropylene, polybutadiene, polyisoprene, polychloroprene, polystyrene, polybutene, poly α-methylstyrene, polyvinyl acetate, polyvinyl chloride, polyacrylate, polymethacrylate, polyacrylonitrile, polyamides (e.g., nylon 6; nylon 6,6; nylon 6,10; nylon 12; nylon 11; nylon 4,6, etc.), polyesters (e.g., polyethylene terephthalate, polybutylene terephthalate, polyarylates, etc.), polyurethanes, polyacetals, polycarbonates, polyphenylene oxides, polyphenylene sulfide sulfones, polyphenylene sulfide ketones, polysulfones, polyether sulfones, polyaryl sulfones, polyether ketones, polyether ether ketones, polyimides, polyamide imides, silicone resins, phenoxy resins, fluorine resins and the like; random or block graft-copolymers thereof; and mixtures thereof may be blended with the present PPS copolymers.

Now, the conditions under which the halogen-ended polymers of formula (II) is produced will be described.

Typical examples of the hydroxy-ended polyalkylene glycols represented by formula (III) which may be used in the invention include addition polymers of alkylene oxides with polyhydric alcohols (e.g., polyethylene glycol, polypropylene glycol, polytetramethylene glycol, polyethylene glycol/polypropylene glycol random or block copolymer, glycerin, pentaerythritol, sorbitol and the like); and monoalkyl ethers, monophenyl ethers and monobenzyl ethers of said addition polymers; and the like.

Typical examples of the hydroxy-ended polyolefins represented by formula (III) which may be used in the invention include $\alpha,\omega$-dihydroxypolyethylene, $\alpha,\omega$-dihydroxypolypropylene and $\alpha,\omega$-dihydroxypoly(ethylene/1-butene) copolymer; and monoalkylether, monophenyl ether and monobenzyl ether of the above-listed members; and the like.

As the aromatic dihalogen compound reactant of formula (IV) used in the invention, an aromatic dihalogen compound that is activated by electron attractive groups and is susceptible to a nucleophilic attack of the end hydroxyl groups of the other reactant polyalkylene glycol or polyolefin is preferred. Alternatively, a difluorobenzene having fluorine substituents which are halogen active to the nucleophilic attack.

Typical examples of the aromatic dihalogen compounds which may be mentioned are listed below:
2,6-dichlorobenzonitrile,
2,6-dichlorobenzamide,
2,4-dichlorobenzophenone,
2,4'-dichlorobenzophenone,
4,4'-dichlorobenzophenone,
2,3-dichloronitrobenzene,
2,4-dichloronitrobenzene,
2,5-dichloronitrobenzene,
3,4-dichloronitrobenzene,
3,5-dichloronitrobenzene,
4,4'-dichloroazoxybenzene,
1,4-bis(p-chlorobenzoyl)-diaminobenzene,
2,4-dichlorobenzoic acid,
2,5-dichlorobenzoic acid,
2,6-dichlorobenzoic acid,
3,4-dichlorobenzoic acid,
3,5-dichlorobenzoic acid,
sodium 2,4-dichlorobenzoate,
4,4'-dichlorodiphenyl sulfone,
2,5-dichlorobenzene sulfonic acid,
sodium 2,5-dichlorobenzene sulfonate,
2,6-difluorobenzamide,
3,4-difluorobenzamide,
m-difluorobenzene,
o-difluorobenzene,
p-difluorobenzene,
2,4-difluorobenzoic acid,
2,5-difluorobenzoic acid,
2,6-difluorobenzoic acid,
3,4-difluorobenzoic acid,
2,4-difluorobenzonitrile,
2,5-difluorobenzonitrile,
2,6-difluorobenzonitrile,
2,4'-difluorobenzophenone,
4,4'-difluorobenzophenone,
4,4'-difluorodiphenyl sulfone,
2,4-difluoronitrobenzene,
2,5-difluoronitrobenzene,
3,4-difluoronitrobenzene, and mixtures thereof.

In the invention, the aromatic dihalogen compound (IV) should be used in a proportion of greater than 1 mole, preferably greater than 3 mole, per mole of the end hydroxyl groups of the hydroxy-ended polyolefin or polyalkylene glycol of formula (III), so that the halogenation of the polyolefin or polyalkylene glycol at their ends or end is ensured to quantitatively occur.

The base used in the preparation of the halogen-ended polymers (II) should exhibit a basicity sufficient to withdraw protons from the end hydroxyl group or groups of the polyolefins or polyalkylene glycols of formula (III). Examples of the base which may be mentioned include alkali metal hydroxides, alkali metal carbonates, alkali metals per se, alkali metal hydrides, organo metal compounds (e.g., organo lithium compound, Grignard reagents), alkali metal alkoxylates and the like. Particular examples of the bases which are preferably used in the invention include lithium, sodium, potassium, sodium hydride, n-butyl lithium, sec-butyl lithium, n-butyl magnesium chloride, phenyl magnesium bromide, sodium methoxide, potassium-t-butoxide and mixtures thereof.

The base should be used in a proportion sufficient for that the end hydroxyl group or groups of the polyolefin or polyalkylene glycol is quantitatively metallized. Thus, the base is preferably used in at least an equimolar quantity with respect to said end hydroxyl group(s).

The reaction solvent used in the preparation of the halogen-ended polymer of the invention should be a solvent for the hydroxyl-ended polyolefin or polyalkylene glycol reactant and should be inreactive with the base present. Thus, an aprotic solvent is preferably used in the process. For example, aromatic hydrocarbons, cyclic ethers, organic amides and sulfones are conveniently employed. Particular examples of the solvents which may be used in the invention include benzene, toluene, xylenes, naphthalene, tetrahydrofuran, dioxane, oxepane, 2,3-benzofuran, 1,3-dioxolane, hexamethyl phosphoramide, tetramethyl urea, N,N-dimethyl formamide, N,N-dimethyl acetamide, N-methyl caprolactam, N-ethyl caprolactam, N-methyl-2-pyrrolidone, N-ethyl-2-pyrrolidone, 1,3-dimethyl-2-imidazolidinone, dimethyl sulfoxide, sulfolane and the like and mixtures thereof.

The solvent is used in such a quantity that the hydroxy-ended polyolefin or polyalkylene glycol is present at a concentration of 1–50%, preferably 3–30%, by weight in the initial reaction mixture.

The reaction between the hydroxy-ended polyolefin or polyalkylene glycol and the aromatic dihalogen compound may be effected under relatively mild conditions. For example, where the reaction is carried out at a temperature of from room temperature to 200° C. for a period of from 30 minutes to 24 hours, the desired end-halogenation will be achieved.

The thus resulting polymeric product may be conventionally recovered from the reacted mixture. For example, the solvent may be removed from the reacted mixture by distillation, flashing or the like and then the polymer may be washed with water and isolated. Alternatively, the reacted mixture may be filtered to remove the solvent and then the polymer may be washed with water and recovered.

EXAMPLE

The invention will be described in detail with reference to the following Examples, but is not restricted only to the Examples.

The molecular weight of the PPS copolymers prepared in the following Examples and Comparative Examples was determined by the ultra-high temperature GPC technique using 1-chloronaphthalene solvent and a UV detector and calculated with reference to a standard calibration curve of polystyrene.

The crystallization speed was determined by preparing specimens of amorphous polymer by quenching a molten sample of polymer and then measuring the crystallization temperature when an amorphous specimen was heated at a rate of 10° C./minute in a DSC apparatus.

Formation of the copolymer was confirmed by IR. The composition of the copolymer was determined by the element analysis.

The halogen introduction at the ends of polymer was calculated by the following equation (V):

$$\text{Functional group introduction} = \frac{\overline{Mn}\,(GPC)}{\overline{Mn}\,(NMR)} \quad (V)$$

wherein $\overline{Mn}$ (GPC) represents the number-average molecular weight determined by GPC using a calibration curve of a standard polystyrene, and $\overline{Mn}$ (NMR) represents the number-average molecular weight determined by obtaining the integrated ratio of the aromatic protons in the residue of aromatic halogen compound introduced at the ends to the aliphatic protons in the polyolefin or polyalkylene glycol by means ¹H-NMR chart and calculating therefrom on the assumption that the aromatic halogen compound has been introduced at all the available ends of the polymer.

If a value of the introduction of functional groups is calculated to be 1.0 using equation (V), it means that halogen has been introduced at all the available end sites of the polymer.

EXAMPLE 1

A 1 liter-capacity separable flask provided with a stirrer and a cooling pipe was charged with 25 g of polyethylene glycol (mean molecular weight=2000; 0.0125 moles) and 500 ml of THF that was dehydrated with calcium hydride and purified by distillation. The mixture was stirred under a nitrogen atmosphere at 30° C. for 15 minutes to dissolve the polyethylene glycol. After the polyethylene glycol was thoroughly dissolved in the THF, 1.0 g of sodium hydride (as a 60% suspension in paraffin; 0.025 moles) was added to the solution, which was stirred at 30° C. for a further 2 hours to thoroughly dissolve the sodium hydride and to permit it to completely react. Thereafter, 14.4 g of 4,4'-dichlorodiphenyl sulfone (0.05 moles) was added to the mixture, which was allowed to react at 30° C. for a further 20 hours. On completion of the reaction, the reacted solution was dropwise added into a large quantity of diethyl ether so as to precipitate the product polymer, which was then isolated by collecting it on a sintered glass filter. The thus obtained polymer was further purified by reprecipitating it from a methanol/diethyl ether system and dried under vacuum at room temperature to remove the solvent system. The polymer was obtained in a yield of 27.7 g (89%). The number average molecular weights determined by the GPC and ¹H-NMR techniques were 2500 and 2580, respectively. The polymer exhibited a functional group introduction of 0.97, which was represented by a ratio of the number of the introduced halogen atoms to the number of the halogen-receptible end sites of the polymer.

Figure 2:
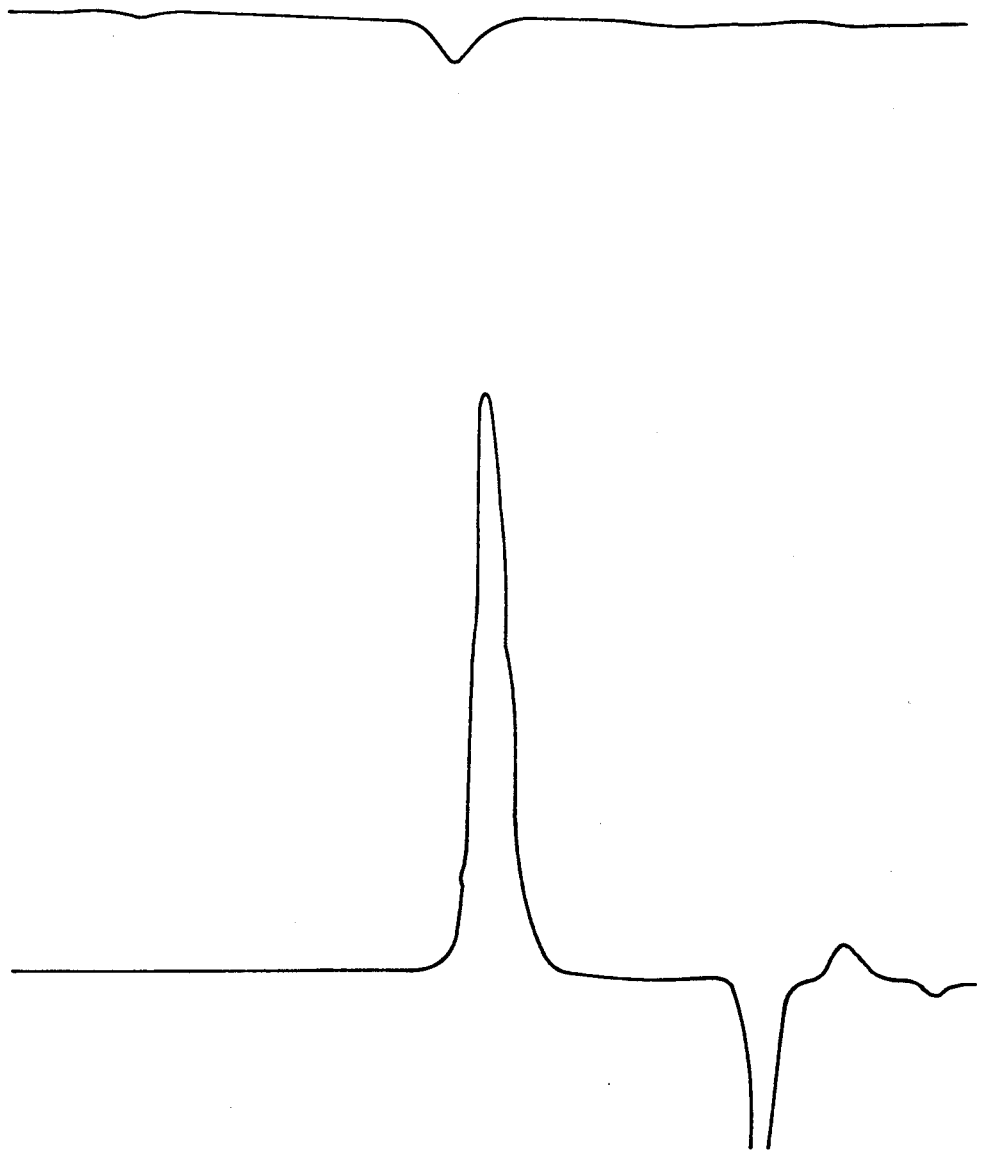

FIGS. 1 and 2 show the GPC data which were obtained with the unmodified and modified polyethylene glycols using a UV detector as well as an RI detector. In each of FIGS. 1 and 2, the upper curve is one which was drawn by the UV detector and the bottom curve is one drawn by the RI detector. Since the aromatic rings are not introduced before the modification, the polymer is detected by the RI detector, but not by the UV detector. However, after the modification, the polymer can be now detected even by the UV detector, because the residues of aromatic dihalogen compound have been introduced.

It is believed that the introduction of the end groups was quantitatively caused in this Example, because the respective curves obtained by the both detectors were similar to each other, the shapes of the peaks observed before and after the modification are substantially identical and the change in the molecular weight was small. The halogen-ended polyethylene glycol obtained in this Example will be abbreviated as "PEG-1" hereinafter. The results are summarized in Table 1 below.

EXAMPLES 2-4

The procedure of Example 1 was repeated using various polyethylene glycols different in the molecular weight. The resulting polymers showed functional group introductions of 0.95, 0.96 and 0.98, respectively, indicative of a quantitative halogenation at the ends of polymer in each of the cases. The halogen-ended polyethylene glycols thus obtained will be referred to as "PEG-2", "PEG-3" and "PEG-4", respectively. (See Table 1)

EXAMPLES 5-8

The procedure of Example 1 was repeated except that a polypropylene glycol, polyetramethylene glycol, polyethylene glycol-polypropylene glycol block copolymer or polyethylene carrying hydroxyl groups at both the ends was employed in place of the polyethylene glycol of Example 1.

The functional group introductions of the resulting polymers were in the range of 0.89-0.96, indicative of a quantitative halogenation at the ends of polymer in each of the cases. The product polymers will be referred to as "PPG-1", "PTMG-1", "PEG-PPG-1" and "PHO-1", respectively. (See Table 1)

COMPARATIVE EXAMPLE 1

The procedure of Example 1 was repeated with omitting the sodium hydride. The resulting polymer showed no peak resulting from the presence of aromatic proton in the GPC detection. (See Table 1)

COMPARATIVE EXAMPLE 2

The procedure of Example 1 was repeated except that p-dichlorobenzene was used in place of the 4,4'-dichlorodiphenyl sulfone. The resulting polymer showed a functional group introduction as low as 0.35. This indicates that where an aromatic dihalogen compound that is free of electron attractive groups and is not or little active, the halogenation is difficultly caused to quantitatively occur at the ends of polymer. (see Table 1)

EXAMPLE 9

A 500 ml-capacity autoclave was charged with 0.6 moles of sodium sulfide; $Na_2S.2.9H_2O$ and 150 ml of N-methyl-2-pyrrolidone (referred to as NMP hereinafter). The mixture was stirred under a stream of nitrogen and heated up to 200° C. so as to distill off 21.2 g of a distillate consisting mainly of water. The reactor system was cooled down to 170° C., and thereafter 0.599 moles of p-dichlorobenzene (p-DCB) and 3.41 g of PEG-1 (0.0014 moles) were added together with 50 g of NMP. Then the reactor system was sealed under a nitrogen stream and heated to 250° C. so as to polymerize the mixture for 3 hours. Upon completion of the polymerization, the system was cooled and the contents were poured into a mass of water so as to precipitate the polymer. The precipitated polymer was collected by means of glass funnel and washed with 5 l of warm water and filtered again. The filter cake was extracted with methanol to completely remove any unreacted PEG-1 and, then, dried overnight under vacuum with heating. Thus, the polymer was obtained in an amount of 61.5 g (90% yield). The composition of the copolymer was calculated to be PPS: polyethylene glycol=96:4 on the basis of the elemental analysis. By IR spectroscopy, it was shown there was an absorption at 2850 cm$^{-1}$ caused by methylene moieties of the polyethylene glycol in addition to the absorptions caused by PPS, and thus formation of a copolymer of PPS and polyethylene glycol was confirmed (see FIG. 3). By ultra-high temperature GPC, it was found that the product PPS copolymer had a weight-average molecular weight of 22,000. Using a DSC, the glass transition temperature Tg, crystallization temperature Tc and melting point Tm were determined to be 70° C., 106° C. and 281° C., respectively. As compared with the corresponding PPS homopolymer, these Tg and Tc values were significantly lowered, while the melting point value was maintained without being lowered (see Table 2). Therefore, the PPS copolymer according to the present invention exhibits an increased speed of crystallization without impairing the heat resistance properties of PPS and, thus, will be permitted to be injection molded using a low mold temperature of, way, less than 100° C., while sufficiently crystallizing to provide moldings of an excellent heat resistance without necessity of annealing after molding.

EXAMPLES 10-14

The polymerization procedures of Example 9 was repeated using PEG-2, PPG-1, PTMG-1, PEG-PPG-1 or PHO-1 in place of PEG-1. All the resulting PPS copolymers exhibited Tc values lower than that of PPS homopolymer, indicative of their increased crystallization speeds (see Table 2).

COMPARATIVE EXAMPLE 3

The polymerization procedure of Example 9 was repeated omitting PEG-1. The resulting polymer showed a Tc value higher than those of the PPS copolymers obtained in the Examples according to the invention. Such a high Tc is indicative of a low crystallization speed (see Table 2).

As can be seen from the above description, according to the invention, a class of halogen-ended polyalkylene glycols and halogen-ended polyolefins (II) which are copolymerizable with polyarylene sulfides or sulfone-based polymers can be easily produced. These halogen-ended polymers may be readily copolymerized with polyarylene sulfides or sulfone-based polymers to provide polyphenylene sulfide copolymers exhibiting increased crystallization speeds. These high crystallization speeds enable the copolymers to be molded in a low-temperature mold, for example, at 100° C. or less, while providing fully crystallized moldings.

TABLE 1

| | Hydroxy-ended polymers | | | Added sodium hydride (moles) | Aromatic dihalogen compounds | |
|---|---|---|---|---|---|---|
| | Name | Mn | Amount (moles) | | Name | Amount (moles) |
| Example | | | | | | |
| 1 | PEG | 2000 | 0.0125 | 0.025 | DCDPS | 0.05 |
| 2 | " | 20000 | 0.0025 | 0.005 | " | 0.01 |
| 3 | " | 600 | 0.083 | 0.166 | " | 0.33 |
| 4 | " | 300000 | $1.7 \times 10^{-4}$ | $3.3 \times 10^{-4}$ | " | $6.6 \times 10^{-4}$ |
| 5 | PPG | 2000 | 0.025 | 0.05 | " | 0.1 |
| 6 | PTMG | 2000 | 0.025 | 0.05 | " | 0.1 |
| 7 | PEG—PPG | 2400 | 0.0125 | 0.025 | " | 0.05 |
| 8 | PHO | 2800 | 0.009 | 0.018 | " | 0.036 |
| Comparative Example | | | | | | |
| 1 | PEG | 2000 | 0.0125 | 0 | DCDPS | 0.05 |
| 2 | " | 2000 | 0.0125 | 0.025 | p-DCB | 0.05 |

| | Solvent | | Halogen-ended polymers | | | |
|---|---|---|---|---|---|---|
| | Name | Amount (ml) | Yield (%) | Mn (GPC) | Mn (NMR) | Functional group introduction | Abbreviations |
| Example | | | | | | | |
| 1 | THF | 500 | 89 | 2500 | 2580 | 0.97 | PEG-1 |
| 2 | " | " | 97 | 20800 | 22000 | 0.95 | PEG-2 |
| 3 | " | " | 88 | 1070 | 1120 | 0.96 | PEG-3 |
| 4 | " | " | 90 | 301000 | 307000 | 0.98 | PEG-4 |
| 5 | " | " | 98 | 2400 | 2700 | 0.89 | PPG-1 |
| 6 | " | " | 89 | 2500 | 2600 | 0.96 | PTMG-1 |
| 7 | " | " | 97 | 2800 | 2920 | 0.96 | PEG—PPG-1 |
| 8 | toluene | " | 76 | 3200 | 3510 | 0.91 | PHO-1 |
| Comparative Example | | | | | | | |
| 1 | THF | 500 | 80 | 2000 | —* | — | |
| 2 | " | " | 84 | 2200 | 6300 | 0.35 | |

*No aromatic proton detected.
PEG: Polyethylene glycol; PPG: Polypropylene glycol; PTMG: Polytetramethylene glycol; PEG—PPG: Polyethylene glycol-polypropylene glycol block-copolymer; PHO: Polyethylene carrying hydroxyl groups at the both ends thereof; DCDPS: 4,4'-dichlorodiphenyl sulfone; p-DCB: p-dichlorobenzene; THF: Tetrahydrofuran

TABLE 2

| | Na₂S (moles) | P-DCB (moles) | Halogen-ended polymers Name | Amount (moles) | Polymerization temperature (°C.) | Polymerization time (hrs.) |
|---|---|---|---|---|---|---|
| Example | | | | | | |
| 9 | 0.600 | 0.599 | PEG-1 | 0.0014 | 250 | 3 |
| 10 | " | 0.597 | PEG-2 | 0.0031 | 220 | 5 |
| 11 | " | 0.599 | PPG-1 | 0.0014 | " | " |
| 12 | " | " | PTMG-1 | " | " | " |
| 13 | " | " | PEG-PPG-1 | " | " | " |
| 14 | " | " | PHO-1 | 0.0010 | " | " |
| Comparative Example 3 | " | 0.600 | — | " | 250 | 3 |

| | Yield (%) | Compositions of copolymers PPS:Polyalkylene glycol or Polyethylene | Mw | Tg (°C.) | Tc (°C.) | Tm (°C.) |
|---|---|---|---|---|---|---|
| Example | | | | | | |
| 9 | 90 | 96:4 | 22,000 | 70 | 106 | 281 |
| 10 | 89 | 96:4 | 25,000 | 75 | 112 | 288 |
| 11 | 91 | 95:5 | 24,000 | 75 | 109 | 281 |
| 12 | 92 | 96:4 | 24,000 | 72 | 103 | 284 |
| 13 | 91 | 95:5 | 21,000 | 74 | 113 | 282 |
| 14 | 95 | 95:5 | 25,000 | 80 | 114 | 284 |
| Comparative Example 3 | 96 | 100:0 | 29,000 | 90 | 130 | 281 |

What is claimed is:

1. An easily crystallizable polyphenylene sulfide copolymer of the structure represented by formula (I):

$$R\{(\!(O)_{l}R')_{m}O\!-\!\!\underset{(Y)_{p}}{\underbrace{\bigcirc}}\!-\!Y'\}_{n}\underset{(Y)_{p'}}{\underbrace{\bigcirc}}\!-\!S\!-\!\underset{}{\underbrace{\bigcirc}}\}_{r}X]_{q} \quad (I)$$

wherein R is hydrogen or an organic group containing 1-24 carbon atoms, each of groups R' is an alkylene group containing 2-6 carbon atoms, each of groups Y is an electron attractive monovalent group, each of groups Y' is an electron attractive divalent group, X is a halogen, l is an integer of zero or 1, m is an integer of from 10 to 10,000, n is an integer of from zero to 4, p is an integer of from zero to 4, p' is an integer of from zero to 4, q is an integer of from 1 to 10, and r is an integer of from 20 to 2,000.

2. A copolymer as claimed in claim 1 wherein R is a $C_1$-$C_{12}$ organic group, R' is a $C_2$-$C_4$ alkylene group, Y is a cyano group, Y' is a sulfone or carbonyl group, X is fluorine, chlorine or bromine, m is 10-7,000, n is zero or 1, p and p' are each zero or 1, q is from 1 to 6, r is from 20 to 1,000 and l is 1 or unity.

3. A copolymer as claimed in claim 1, wherein l is 0.

4. A copolymer as claimed in claim 1, wherein l is 1.